United States Patent [19]

Jackman

[11] 4,416,702
[45] Nov. 22, 1983

[54] TAPE CARTRIDGE CLEANER

[75] Inventor: James E. Jackman, Graham, Tex.

[73] Assignee: Graham Magnetics, Incorporated, North Richland Hills, Tex.

[21] Appl. No.: 366,852

[22] Filed: Apr. 9, 1982

[51] Int. Cl.³ .............................. B08B 5/02; B08B 5/04
[52] U.S. Cl. ........................................... 134/6; 134/21; 15/304; 15/311; 15/346
[58] Field of Search ...................... 15/304, 310, 312 R, 15/311, 345, 346; 134/21, 6

[56] References Cited

U.S. PATENT DOCUMENTS

| | | | |
|---|---|---|---|
| 3,370,982 | 2/1968 | Hayunga | 15/346 X |
| 3,733,639 | 5/1973 | Timian | 15/304 |
| 3,936,902 | 2/1976 | Shackleton et al. | 15/345 X |
| 4,213,223 | 7/1980 | Cosby | 15/311 X |

FOREIGN PATENT DOCUMENTS 389034 3/1933 United Kingdom .................. 15/346

Primary Examiner—Chris K. Moore
Attorney, Agent, or Firm—Andrew F. Kehoe

[57] ABSTRACT

Improved apparatus for cleaning generally cylindrical articles of irregular configuration and, particularly, for cleaning straps of the type used to hold magnetic tape and supplied by manufacturers for use with magnetic tapes. The apparatus comprises a porous cleaning element comprised of multiple felt-cleaning faces resiliently mounted for contact with the inside of the cylinder, or ring, of the strap. The porous elements form means to remove dirt from the article being cleaned without any accumulation of excess dirt on the cleaning head.

7 Claims, 7 Drawing Figures

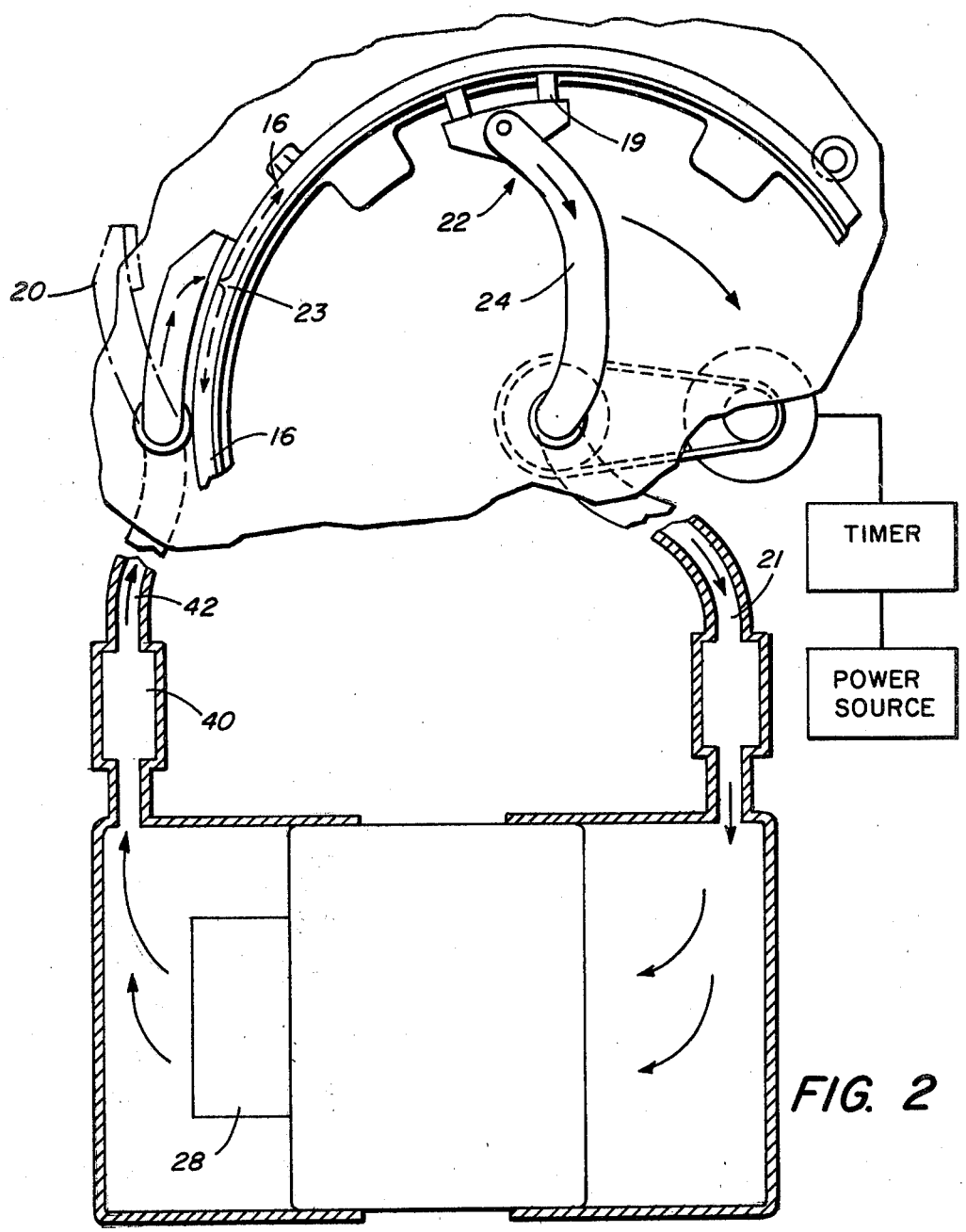
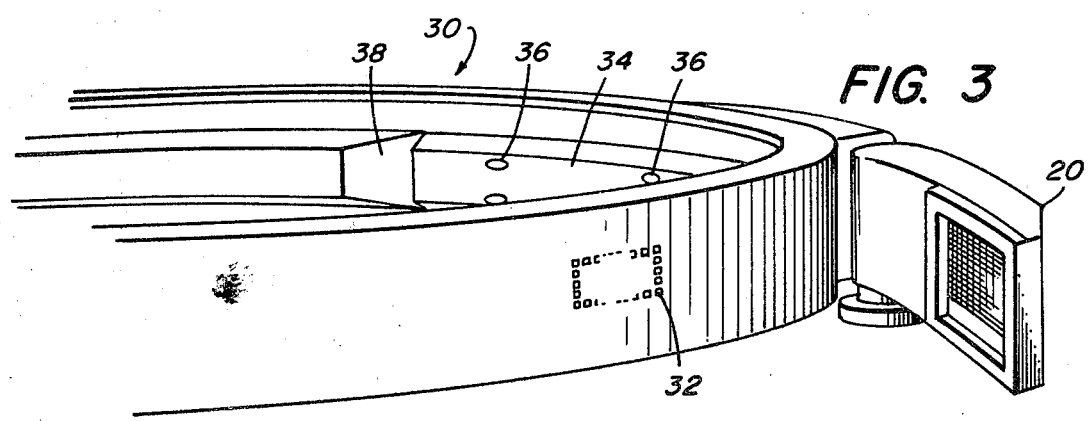
FIG. 2
FIG. 3

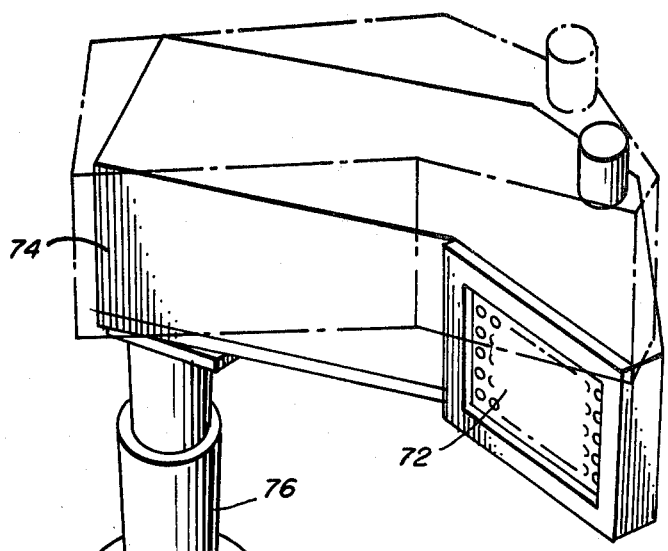
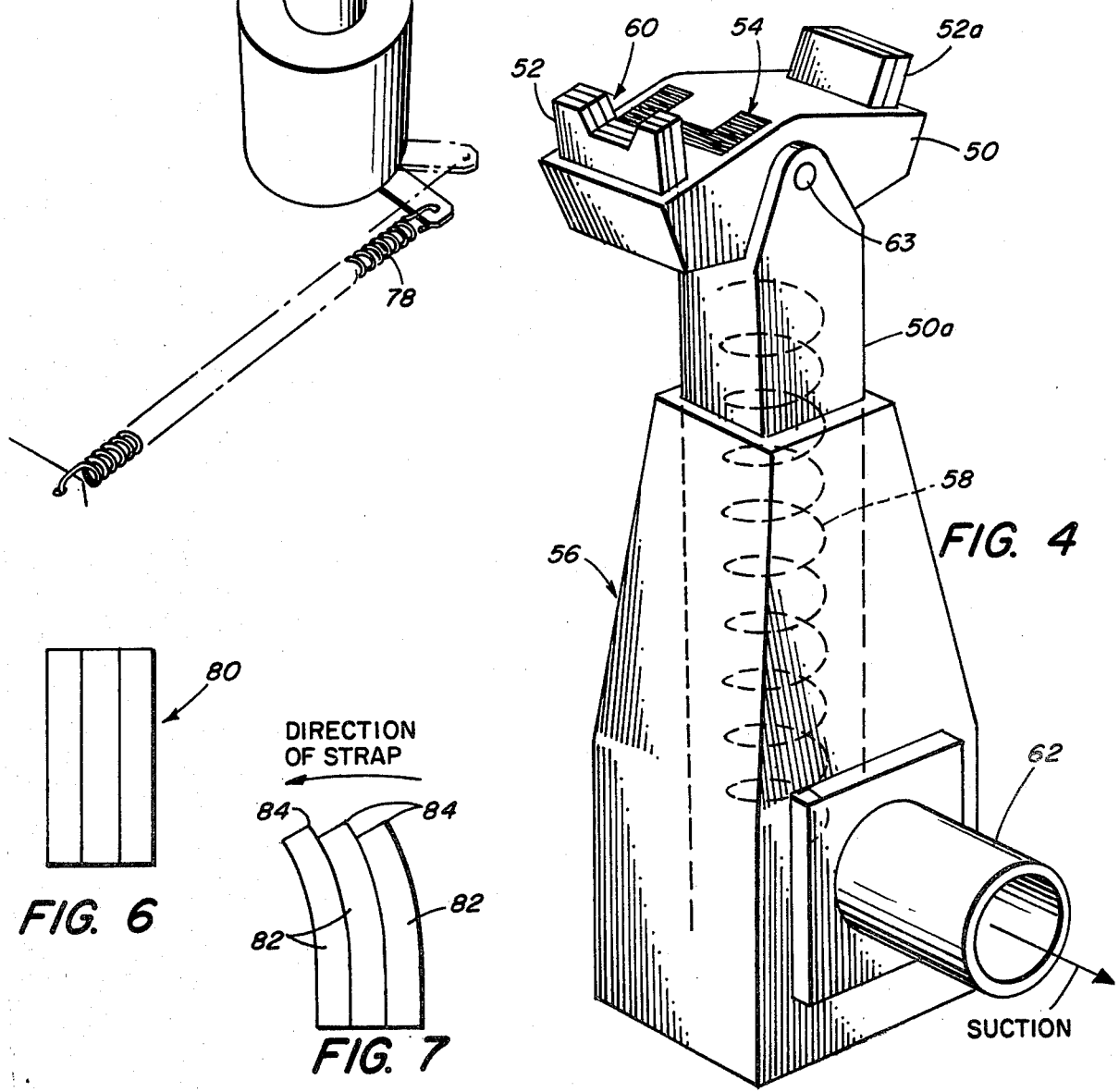

TAPE CARTRIDGE CLEANER

BACKGROUND OF THE INVENTION

This invention relates to an apparatus for dry cleaning of generally cylindrical articles of irregular configuration. The invention particularly relates to a means to clean so-called "easy load straps" which are used in conjunction with magnetic tapes to facilitate their handling and loading in read/write equipment. Such straps are ring shaped, normally comprise a channel and apertures therein to facilitate fluidic manipulation of the tape when it is mounted on, e.g., tape reading apparatus.

It has been generally known that it is desirable to clean magnetic tape from time to time and thereby to remove debris which can tend to accumulate thereon. Such debris, for example, can be dust or the result of buildup of abraded coatings on tape processing equipment. The buildup will, from time to time, fall onto the tape. Such cleaning is important where computerized records are stored on the tape. Very often, too, the cleaning is done contemporaneously with the inspection or recertification of second-hand tape.

Despite periodic cleaning and despite great care to avoid dust and other contamination on tape, there had been a number of sources of contamination that remained substantial problems.

U.S. Pat. Nos. 4,213,223 and 4,290,821 to Cosby describe substantial improvements in this area. This invention relates to an improvement in the Cosby apparatus.

Among such sources of tape contamination have been the so-called easy-load straps, e.g., that are sold under "Easyload II and III" by IBM. Some refer to such a strap as a "cartridge". Such straps are of molded plastic construction and handling and loading of reels of magnetic tape have gained wide acceptance in the computer industry. However, debris from such straps is now believed to be a significant source of tape contamination and the inventor has set out to devise a practical means to free the straps of such contamination despite their complex shape and the number of orifices which provide potential sites for debris to become situated during a clearing operation.

SUMMARY OF THE INVENTION

It is a principal object of the invention to provide an improved means to clean articles which are generally cylindrical in shape but have irregular configurations along the generally cylindrical wall.

A further object of the invention is to provide a process and means to quickly and economically remove debris from apertured loading straps of the type used in handling and fluidic processing of magnetic tape.

Another object of the invention is to provide means to remove such debris while maximizing the probability that it will be removed from the cleaning apparatus in a suction stream or be permanently held within the cleaning element.

Another object of the invention is to provide a cleaning element that will exhibit visual signs of its becoming excessively dirty.

Still other objects of the invention will be obvious to those skilled in the art on their reading of this disclosure.

The above objects have been achieved by construction of an improved apparatus of the type that comprises a means to mount an empty easy-load tape strap, positive air supply means mounted for blowing air into one side of the strap, e.g., the exterior of a ring-shaped strap, and, at the same time, suction means for sucking the air from the interior side of the strap ring. As in the earlier Cosby device, the suction means comprises a nozzle which advantageously rotates while the strap and external air nozzle are in fixed position.

However, the present inventor has replaced the brush of the Cosby device with a porous, wiping member formed of felt, or a like material and, preferably, comprising multiple wiping surfaces when it is rotated relative to the surface being cleaned.

In order to describe the invention as it relates to cleaning easy-load straps of the type used with magnetic tape, it is desirable to understand that such straps comprise an air channel whereby air is supplied to various apertures which are carefully positioned around the inside of the strap. This air is used to pick up the end of a magnetic tape and feed it to, for example, the magnetic reading equipment. It is not only important to keep this channel and these holes free of dirt, but it is important to keep fugitive dirt from being forced back into the channel through the holes by the cleaning implement during the cleaning operation. It is also important to keep any dirt from being accumulated on the cleaning surface because such dirt may fall off, say at the end of a cleaning cycle, when the vacuum is shut down and remain on the part to have been cleaned. It was found that this would happen from time to time when a brush element was used. It was also found that it was not always easy to detect when build-up on some portion of the brush reached an unacceptable point.

ILLUSTRATIVE EMBODIMENT OF THE INVENTION

In this application and accompanying drawings there is shown and described a preferred embodiment of the invention and suggested various alternatives and modifications thereof, but it is to be understood that these are not intended to be exhaustive and that other changes and modifications can be made within the scope of the invention. These suggestions herein are selected and included for purposes of illustration in order that others skilled in the art will more fully understand the invention and the principles thereof and will be able to modify it and embody it in a variety of forms, each as may be best suited in the condition of a particular case.

In the Drawings:

FIG. 2 is a somewhat schematic diagram showing the pneumatic flow-scheme associated with the ring-cleaning apparatus.

FIG. 3 illustrates a segment of a typical object to be cleaned indicating the air-accomodating passages therein.

FIG. 4 is a perspective view of a vacuum cleaning element construction of the invention in operating the improved apparatus.

FIG. 5 is a perspective view of an air-supply nozzle useful in construction of the apparatus of the invention.

FIG. 6 is a schematic elevation of a porous cleaning element pad useful in the invention.

FIG. 7 is a view of the cleaning element as it appears when it is biased against a strap surface being cleaned.

Figure 1:
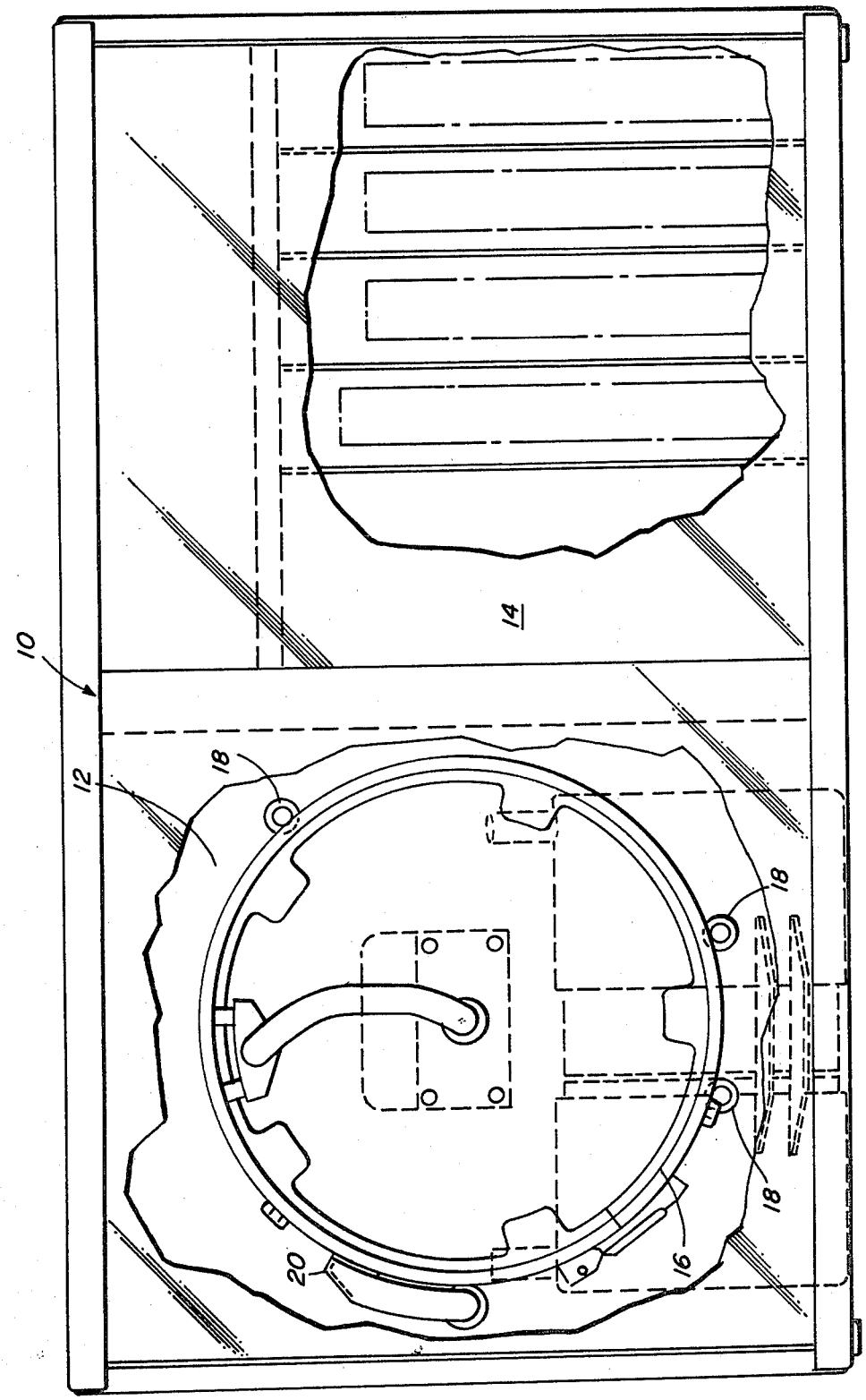
FIG. 1 is a schematic elevation, from the front of an apparatus of the invention showing the general construction of the ring-cleaning apparatus.

Referring to FIG. 1, it is seen that cleaning apparatus 10 comprises a cleaning section 12 and a storage cabinet section 14 in easy-load strap 16 of the type used in the magnetic tape industry is shown mounted on a frame whereby it is positioned by position pins 18 and, in part, an air-supply nozzle 20.

FIG. 3 illustrates a segment 30 of the strap 16 showing a grid of external apertures 32 into which nozzle 20 is to supply air under pressure when the strap is mounted as is shown in FIG. 1. The air so supplied goes through a channel, the external configuration of which is shown at 34 within strap 16 and comes out of all of a series of apertures 36 internally spaced around the inner periphery of strap 16.

As is shown in FIG. 2, channel 34 is represented by an annular conduit 23 which is integrally molded into strap 16.

Both air-supply nozzle 20 and the strap 16 are in fixed position during the illustrated cleaning operation. However, an internally-mounted suction cleaner 22 comprising a cleaning element 19 (shown schematically only) and a suction conduit 24 is rotated at about 8 rpm within the ring formed by strap 16. The cleaning-element-bearing vacuum head of cleaner 22 is mounted for biased contact with the interior wall of the ring even at those irregularities and discontinuities as shown in FIG. 3 at 38.

FIG. 2 further illustrates how air is sucked through the cleaning element 19 and is carried via conduit 24 and conduit 21 back to the intake of fan 28. Hence air moves through the fan 28 back into prefilter 40 in conduit 42 and thence to air supply nozzle which acts as a positive pressure means to apertures 32. With reference to FIG. 4, it should be noted that, while much of the airflow is sucked through nozzle slot 54a, sufficient air enters the cleaning paid to carry enough dirt to give a visual discoloration indicative of the need to provide a clean media or the need to replace a worn media.

Referring to FIG. 4, it will be seen that a suction nozzle according to the invention will comprise a cleaning head 50 comprising filter pads 52 and 52a and a suction nozzle slot 54. Each of pads 52 and 52a are really formed of a plurality of felt members as best seen in FIGS. 6 and 7. Pad 52 is cut out at 60 so that it can get closer to the strap surface.

Head 50 is biased for reciprocal movement via pivot 63 and slider and vacuum conduit 50a which is mounted inside arm and vacuum conduit 56. Spring 58 applies force between members 50a and 56. Extending from member 56 is an air conduit extension arm 62 which directs suction through the faceplate of apparatus 10 and thence to vacuum pump as seen in FIG. 2. Extending from member 56 is an air conduit extension arm 62 which directs the suction through the face plate of apparatus 10 and thence to the vacuum pump 38.

FIG. 6 illustrates a typical cleaning element 80 of the invention comprising three bonded porous felt elements 82 which, as shown in FIG. 7, bend with the stresses applied by the rotating strap to be cleaned and the biasing means. This bending action results in multiple spaced cleaning surfaces 84 being presented to the surface of the strap being cleaned.

FIG. 5 illustrates a typical pressure supply nozzle 70 which comprises a series of air-outlet apertures 72 and a nozzle head member 74. Head 74 is mounted for rotation on a shaft 76 which extends from below the faceplate of the apparatus and is held by a spring means 78 which normally pulls the head member 74 into air-supply position with the aperture 32 shown in FIG. 3, but is readily extended to facilitate positioning of the strap.

A dual purpose vacuum blower such as that sold under the trade designation Model 115250 by Lamb Electric Division of AMETEK is suitable for use.

A door 17 is adapted to slide over the strap thereby forming a closed cleaning chamber through which the cleaning air may be circulated with relatively little contamination of, or leakage into, the environment of the strap cleaning apparatus.

It is also to be understood that the following claims are intended to cover all of the generic and specific features of the invention herein described and all statements of the scope of the invention which might be said to fall therebetween.

What is claimed is:

1. In apparatus for cleaning the interior surface of a generally cylindrical ring-shaped article comprising an air passage between the interior and exterior walls thereof and without contaminating said passage, said apparatus containing
    (a) means to mount said cylindrical object in a fixed position,
    (b) positive pressure supply means to continuously supply air into apertures in said exterior wall and through said passage to apertures in the interior wall,
    (c) suction cleaning means mounted for relative rotation with respect to and cleaning contact with, the interior wall of said cylindrical article,
    (d) said positive pressure means serving to continuously bar any debris, loosened by said cleaning means during said cleaning, from entering said apertures and said passage during cleaning,
the improvement wherein said cleaning means comprises a porous pad comprising a plurality of cleaning edges and forming means to absorb some of said debris.

2. Apparatus as defined in claim 1 wherein said cleaning head has a porous pad cleaning element on each side of a primary suction conduit.

3. Apparatus as defined in claims 1 or 2 wherein at least one said cleaning element is formed of a plurality of felt pads laminated together in planes roughly normal to the surface being cleaned and wherein each said pad forms an independent wiping means.

4. Apparatus as defined in claim 2 wherein one said pad comprises a cut out section to allow said pad to better contact a strap being cleaned.

5. In a process for cleaning interior walls of a ring-like strap of the type used to hold and release magnetic tape for fluidic feeding in tape-reading apparatus, the strap comprising an annular conduit between interior and exterior walls of said strap, said conduit terminating in spaced apertures in said interior wall thereof, said process comprising the steps of
    (a) supplying the air through said exterior wall under pressure into said annular conduit to maintain positive air-streams coming out of said apertures in said interior wall and, thereby, preventing dirt in interior walls from being forced into said apertures while
    (b) carrying out a relative rotation between (1) a suction-cleaning means mounted in biased contact with said interior wall and (2) the interior wall of said strap,
the improvement wherein said process comprises the step of utilizing a porous suction cleaning media for receiving within the mass of said cleaning media said dirt.

6. A process as defined in claim 5 wherein said relative rotation is carried out at about 8 revolutions per minute and wherein said process comprises a plurality of cleaning edges of said porous cleaning medium wiping the interior wall as it rotates relative to said cleaning media.

7. A process as defined in claim 5 or 6 wherein said cleaning means is a multi-ply felt media.

* * * * *